United States Patent [19]

Wehner

[11] 3,926,235
[45] Dec. 16, 1975

[54] NUT, CLIP AND PANEL ASSEMBLY

[75] Inventor: William C. Wehner, Clarence Center, N.Y.

[73] Assignee: Multifastener Corporation, Detroit, Mich.

[22] Filed: Mar. 25, 1974

[21] Appl. No.: 454,056

[52] U.S. Cl. .......................... 151/21 C; 151/41.75
[51] Int. Cl.² ......................................... F16B 39/28
[58] Field of Search ............ 151/41.75, 21 C, 21 R; 85/32 CS, 32 V

[56] References Cited
UNITED STATES PATENTS

| 1,126,225 | 1/1915 | Judick | 151/21 R |
| 1,161,317 | 11/1915 | Kielland | 151/21 R |
| 2,228,584 | 1/1941 | Place | 151/41.75 |
| 2,381,176 | 8/1945 | Misfeldt | 151/21 R |
| 2,400,072 | 5/1946 | Burke | 151/21 R |
| 2,581,641 | 1/1952 | Forgaard | 151/21 C |
| 3,461,935 | 8/1969 | Monticelli | 151/21 R |
| R21,769 | 4/1941 | Tinnerman | 151/41.75 |

FOREIGN PATENTS OR APPLICATIONS

| 10,867 | 5/1902 | United Kingdom | 151/21 R |
| 28,697 | 12/1903 | United Kingdom | 151/21 C |
| 685,965 | 4/1930 | France | 85/32 V |

Primary Examiner—Marion Parsons, Jr.
Attorney, Agent, or Firm—Cullen, Settle, Sloman & Cantor

[57] ABSTRACT

An integral nut and clip formed from resilient sheet material. The nut portion comprises at least three laminae of concavo-convex configuration and fixed to one another at their edges in face-to-face contacting relation. The integral clip portion is generally U-shaped, extending from the laminae and the nut portion is concave toward the clip portion.

4 Claims, 6 Drawing Figures

NUT, CLIP AND PANEL ASSEMBLY

FIELD OF THE INVENTION

A nut clip is generally utilized to secure a panel or other structural members to a second panel in face-to-face relation. The commercial nut clip includes a U-shaped clip and a conventional nut secured at one end to the clip. The nut may be welded or staked to the clip, such as shown in U.S. Pat. No. 3,091,272. Integral nut clips have also been suggested by the prior art, including nut clips formed from a continuous strip of sheet material. For example, U.S. Pat. Nos. 2,228,584, 3,123,880 and Reissue 21,769 disclose clips having one or more spaced convolutions having an aperture which threadably engages a bolt to retain a structural member to a panel. The pull-out strength of such structures is however limited and the clip must be used in less severe applications. U.S. Pat. Nos. 2,244,823 and 2,343,947 disclose nut like elements which are formed from a strip of sheet material.

The nut, nut clip and panel assembly of this invention is particularly adapted to overcome the disadvantages of the nut and nut clips shown in the prior art by improving the pull-out strength of the nut portion of the clip and further provide resistance to unthreading the bolt or male fastener, referred to herein as an anti-backoff feature.

SUMMARY OF THE INVENTION

The improved nut clip of this invention is preferably formed from a continuous strip of resilient sheet material, such as spring steel. The nut portion may also be utilized independently of the clip in certain applications. The nut includes at least three, preferably four leaves or laminae in face-to-face contact and relatively fixed at their opposite ends. The lamina each include an aperture and the laminated bore of the nut defined by the aligned lamina apertures is spirally threaded to receive a bolt or the like. And, the laminae are concavo-convex along the axis of the laminated nut bore defining a bearing face on opposite sides of the bore.

The strip is spirally folded upon itself and flattened to define at least three laminae with the interior faces of each lamina in face-to-face contact with the adjacent lamina and the end of the strip received within the fold of the adjacent exterior lamina. A threaded bore is provided through the nut portion, generally perpendicular to the laminae and the nut is concave, with the planar cross-section including the axis of the bore defining an arch providing bearing support for the nut on opposite sides of the bore.

The integral clip portion in the disclosed embodiment is generally U-shaped and extends from the outermost lamina of the nut portion, beneath the concave face of the nut. The clip portion includes an aperture in registry with the threaded bore of the nut and is received around the supporting panel to secure a second panel or structural member to the supporting panel. The bolt or male threaded member is first received through an aperture in the structural member which is to be secured to the supporting panel, through the apertures in the clip portion of the nut clip and the supporting panel and then threadably received in the threaded bore of the nut portion of the nut clip.

As the bolt is threaded into the nut portion bore and torqued in place, the laminae act as a single unit because of the face-to-face contact and the spiral thread. In the preferred embodiment of the invention, the thickness of the strip and therefore the laminae is substantially equal to the width of one thread of the bolt and the female thread of the nut bore. In this manner, the crest of each female thread may be substantially supported on one lamina, although it will be understood that this is an ideal condition. During final torquing of the bolt, the bearing support faces of the nut portion are biased against the supporting panel, resiliently flexing the mid-portion of the nut surrounding the threaded bore. The laminae thus provide independent spring movement and are flexed into the roots of the male thread providing the anti-backoff feature of the disclosed nut. In final assembly, the laminae function as leaves of a spring resisting unthreading of the bolt, such as may be caused by vibration or the like. Further, the improved nut of this invention may be reused repeatedly in contradistinction to many of the integral nut clips shown in the prior art.

Other advantages and meritorious features of the nut, nut clip and panel assembly of this invention will be more fully understood from the following description of the preferred embodiments, the attached drawings and the appended claims.

DESCRIPTION OF THE PREFERRED EMBODIMENTS

Figure 1:
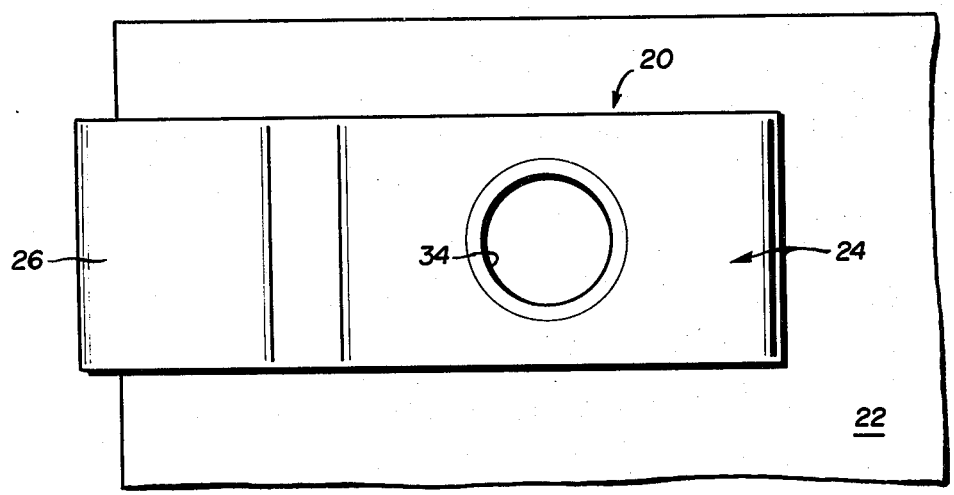
FIG. 1 is a top elevation of one embodiment of the nut clip of this invention received on a supporting panel.
Figure 2:
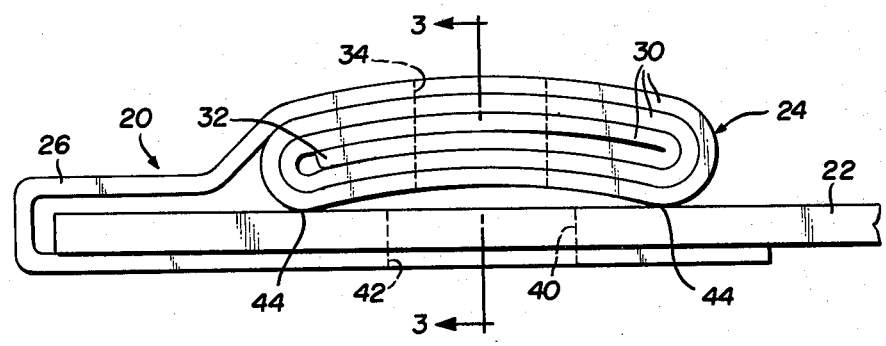
FIG. 2 is a side elevation of the nut clip and supporting panel shown in FIG. 1.
Figure 3:
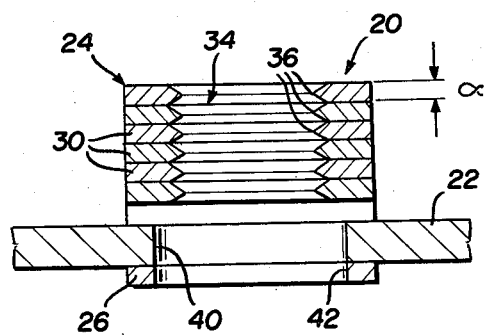
FIG. 3 is an end cross-sectional view of the nut clip and panel shown in FIG. 2, in the direction of view arrows 2—2.

The nut clip 20 shown in FIGS. 1 to 3 is received on a support panel 22 for securement of a second panel or structural member to the supporting panel. The nut clip includes a nut portion 24 and a U-shaped clip portion 26 disposed about the panel 22 as shown in FIG. 2.

The nut portion 24 includes a plurality of spirally folded and flattened laminae 30 as best shown in FIG. 2. The spiral folding of the laminae disposes the end 32 of the strip within the fold of the adjacent exterior lamina, securely retaining the lamina ends and the laminae in face-to-face relation, as shown in FIG. 2, such that the nut portion laminae function as a unit during manufacture of the nut clip and initial threading of the bolt, as described below. This embodiment of the nut clip 20 of this invention includes six inter-folded laminae, however the number of laminae will depend upon the particular application of the nut clip, including the structural requirements of the clip, the thread size of the bolt, etc.

The nut portion 24 includes a threaded bore 34 having an axis which is generally perpendicular to the laminae, as shown in FIG. 2. In the preferred embodiment, the thickness of the laminae is substantially equal to the width of one female thread, as shown by dimension $a$ in FIG. 3. It is understood that the threads are shown schematically in FIG. 3 and that the threads are preferably spiral. It is then possible to define the crest 36 of each female thread substantially within one lamina, providing substantial equal distribution of the threading torque between the individual laminae and permitting the laminae to individually resiliently flex during final torquing of the bolt, as described below.

The nut 20 is disposed upon the supporting panel 22 with the threaded bore 34 coaxially aligned with the circular bore or aperture 40 in the panel and with the clip portion aperture 42 in registry with the panel opening as shown in FIG. 3.

The preferred embodiment of the nut portion 24 is concave toward the supporting panel 22 and the end of the clip portion 26, as shown in FIG. 2, providing bearing support faces 44 on opposite sides of the threaded bore 34. Further, the center portion of the clip portion surrounding the threaded bore 34 is spaced from the supporting panel 22 as shown in FIG. 3. The improved retention, pull-out strength and anti-backoff feature of the nut clip of this invention will be more fully understood from the panel assembly illustrated in FIGS. 4 to 6.

Figure 4:
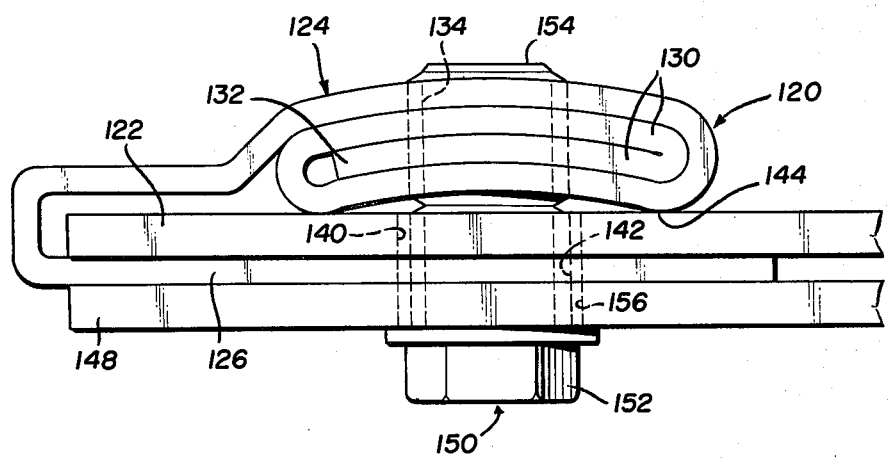
FIG. 4 is a side view of a panel assembly utilizing a second embodiment of the nut clip of this invention.
Figure 5:
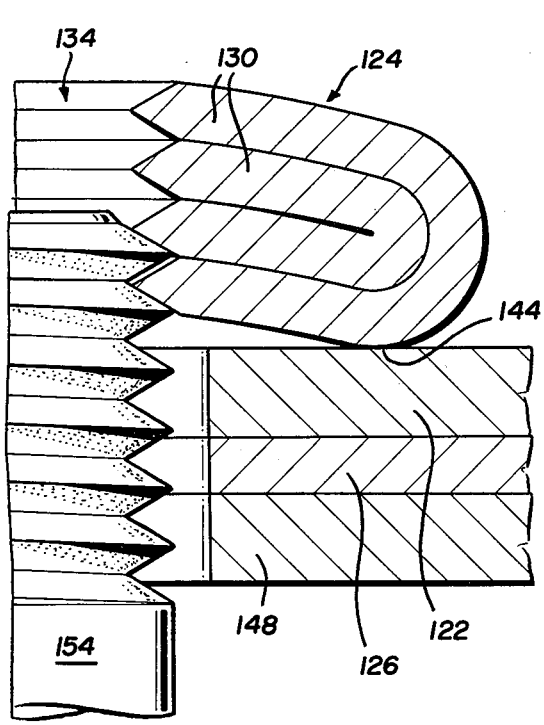
FIG. 5 is a partial, side cross-sectional view of the panel assembly shown in FIG. 4, prior to final torquing of the bolt.
Figure 6:
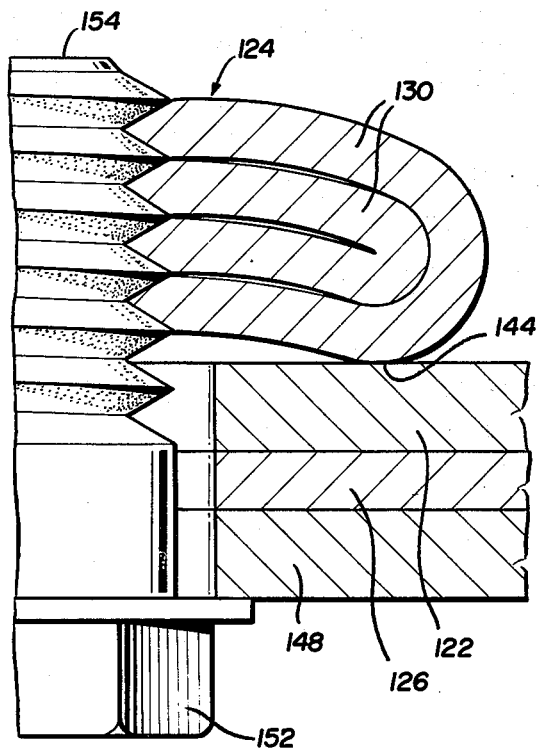
FIG. 6 is a cross-sectional view, similar to FIG. 5, after final torquing of the bolt.

The embodiment of the nut clip 120 shown in FIGS. 4 to 6 is similar to the nut clip described above with the exception that the nut portion 124 includes only four spirally folded and flattened laminae 130. The details of the nut clip shown in FIGS. 4 to 6 are numbered in the same sequence as FIGS. 1 to 3. As described above, the number of lamina will depend upon the particular application, however the preferred embodiment of the nut clip of this invention must include at least three inter-folded laminae and preferably at least four. The utilization of four laminae assures retention of the face-to-face contact between the lamina and permits the utilization of a thicker strip, improving the pull-out strength, proof load, etc. It will be understood that the thread size of the male threaded member or bolt may be specified for a particular application.

The panel assembly shown in FIGS. 4 to 6 includes a second panel or structural member 148 which is to be secured to the supporting panel 122. The second panel is secured by a conventional bolt 150 having a head portion 152 and a threaded shank portion 154. The threaded shank 154 of the bolt is first received through the apertures in the secondary panel 148, clip portion 126 and supporting panel 122, numbered 156, 142 and 140, respectively. The threaded shank is then received within the concave side of the nut portion 124 and threadably received within the spirally threaded bore 134. The nut portion is initially retained on the supporting panel 122 by clip portion 126 and the flanks of the male threads initially engage the flanks of the female threads facing the supporting panel, as shown in FIG. 5. It will be understood that crest of the female threads are normally spaced from the root portion of the male thread during initial torquing. This is due to the normal tolerances between a male and female thread. Further, the nut portion functions as a solid or integral nut during initial torquing, as shown in FIG. 5 and the nut portion is merely supported on the bearing faces 144.

During final torquing however the central portion of the nut, which is spaced from the plane of the supporting panel as described above, is resiliently biased downwardly, toward the supporting panel. In the preferred embodiment of the invention, the nut portion is formed from a strip of resilient sheet material, such that the laminae may resiliently and independently flex during the final torquing of the bolt in the threaded aperture 134. The bearing faces 144 of the nut portion are then biased against the panel, serving as a fulcrum for the resilient laminae, which now act as the leaves of a spring. The individual lamina will then be resiliently biased inwardly and arched, as shown in FIG. 6, between the root of the male threads and the fulcrum provided by the bearing faces 144. In this condition, the crests of the female thread will be biased inwardly into full mating contact with the male threads, providing the anti-backoff feature described above. This feature is provided by the combination of the full face-to-face contact between the spirally inter-folded laminae, the concave configuration of the nut portion and the spirally threaded bore. The anti-backoff feature of the improved nut portion of this invention prevents unthreading of the bolt under vibrational loads and inhibits unthreading of the nut as is desired in many applications. Further, the improved nut clip of this invention has a greater pull-out strength and proof load than the integral nut clips shown in the prior art.

It will be understood that the nut clip of this invention may be formed from various materials depending upon the particular application. In the preferred embodiment of this invention, the nut clip is formed from spring steel, such as 1050 or 1065 carbon steel, which is later heat treated to improve the structural advantages of the nut clip of this invention. Further modifications may also be made to the nut clip of this invention without departing from the purview of the appended claims. For example, the clip portion 126 may include an integrally struck tang portion which extends toward the concave face of the nut clip, as shown in the prior art. The tang retains the nut clip on the supporting panel 122 prior to final assembly of the secondary panel 148 and the bolt 150. Further, other configurations of the nut portion and clip may be utilized provided the leaves or lamina are arched or concave in the cross-section including the axis of the threaded bore in face-to-face contact, with the center portion spaced from the plane of the supporting panel and the bearing faces contacting the panel, as described. The supporting panel 122 may be a structural support, such as the panel of an automobile body and the secondary panel or structural member 148 may be a second panel which is to be secured to the structural support. As described above, the nut portion 124 may also include a greater number of laminae.

I claim:

1. A nut member, comprising: a continuous, relatively thin resilient strip spirally interfolded upon itself and permanently flattened to define at least four laminae in face-to-face contact, a continuous bore through said laminae having a continuous, spiral female thread formed therein, said laminae symetrically concave about the axis of said bore defining a bearing face equally spaced on opposite sides of said bore on the concave side of said nut member, said lamina retained at their opposite sides within the spiral folds of the outer adjacent lamina of said strip, with the central portion including said bore spaced from the plane of said bearing face and free to flex in the axis of said bore, whereby said nut member laminae function as a single unit upon threading a male threaded fastener in said bore, through said concave side of said nut member, and permitting said laminae to resiliently flex about said bearing face upon torquing of the male threaded fastener, the thickness of the laminae equal to approximately the thread pitch.

2. The nut defined in claim 1, including an intergral, generally U-shaped clip portion extending from the outermost lamina of said nut, beneath the concave face of the nut.

3. The integral nut clip defined in claim 1, wherein the cross-section of said nut portion, including the axis of said nut bore, defines an arch defining a bearing support face opposing said clip portion.

4. A panel assembly comprising, in combination, a nut clip formed of a continuous relatively thin resilient strip spirally interfolded upon itself and permanently flattened to define at least four laminae in face-to-face contact with the opposite sides of said laminae retained within the sprial folds of the outer adjacent lamina of said strip, a helically threaded bore through said laminae and a generally U-shaped clip portion extending from the outermost lamina beneath said bore, the thickness of said laminae approximately equal to the thread pitch, said laminae symetrically concave about the axis of said bore toward said clip portion defining a bearing face equally spaced on opposite sides of said bore facing said clip portion, a panel received within said clip portion having an opening aligned with said bore, and a headed male threaded fastener received through the opening in said clip portion, through said panel opening and threadably received in said helically threaded bore, said male threaded fastener biasing said laminae surrounding said bore towards said panel and against said bearing support face, resiliently flexing said laminae inwardly, toward the axis of said bore, against said male fastener and resisting unthreading of said male fastener.

* * * * *